United States Patent [19]

Hemdal et al.

[11] 4,418,396
[45] Nov. 29, 1983

[54] SIGNALLING SYSTEM

[75] Inventors: Goran A. H. Hemdal, Sint-Genesius Rode; Jonny S. Jager, Brussels, both of Belgium

[73] Assignee: International Standard Electric Corporation, New York, N.Y.

[21] Appl. No.: 145,394

[22] Filed: May 1, 1980

[30] Foreign Application Priority Data

May 4, 1979 [BE] Belgium ................................. 57773

[51] Int. Cl.³ ............................................... G06F 3/00
[52] U.S. Cl. ................................................... 364/900
[58] Field of Search ... 364/200 MS File, 900 MS File; 179/18 ES

[56] References Cited

U.S. PATENT DOCUMENTS 4,071,911  1/1978  Mazur ................................. 364/900
4,112,258  9/1978  Alles ........................... 179/18 ES X
4,156,932  5/1979  Robinson et al. ................... 364/200

*Primary Examiner*—Thomas M. Heckler
*Attorney, Agent, or Firm*—John T. O'Halloran

[57] ABSTRACT

Message switching organization for exchanging data messages between function or signalling units within the memory of a processor controlled telecommunications system. Each such function unit has its own program and its own data storage, and the program of a unit has access only to the data storage of its own unit. Messages transmitted between units are of two types, those including information regarding the destination unit address and those omitting destination unit address. Each unit has a message handler area with its own program and data storage, the message handler acting to supply destination unit address information for messages of the second type.

5 Claims, 6 Drawing Figures

SIGNALLING SYSTEM

BACKGROUND OF THE INVENTION

The present invention relates to a signalling system for exchanging data between signalling units by means of data messages, each of said units including message send and receive means and said signalling system including control means cooperating with said signalling units for the transmission of said messages.

Such a signalling system is already known from the articles "AXE-10 System description" by M. Eklund et al, and "AXE-10 Software structure" by G. Hemdal, both published in Ericsson Review, No. 2, 1976, pages 70-89 and 90-99 respectively, this function block oriented stored programme controlled system being also disclosed in U.S. Pat. No. 3,969,701.

This known signalling system, part of this stored programme controlled telecommunication switching system, includes signalling units comprising so-called software function units each with its own data and its own programme having only access to its own data. The modularity thus obtained considerably enhances the reliability of the system because in this way data of a function unit cannot be altered by the programme of another function unit. But then data messages must be exchanged between the various function units, such a message transfer being obviously a potential source of errors.

In the above mentioned system it might be required to substitute a new function unit for another one, e.g. for an erroneously operating function unit. Although in the above mentioned literature no detailed information is given on message transfer, it is clear that in the known system such a modification will give rise to problems because such a modification normally affects the contents of the messages to be transmitted to the new function unit. Indeed, it will then be necessary to adapt all the function units originating these messages to the new situation and this obviously is a complex operation which can therefore not be performed on-line i.e. while the system is operating.

SUMMARY OF THE INVENTION

An object of the present invention is to provide a system of the above type but which however permits signalling units to be substituted into the system without the other signalling units having to be adapted to the new situation.

According to the invention this object is achieved due to the fact that use is made of messages wherein the destination signalling unit is not indicated and that said control means are adapted to allocate a destination signalling unit to each of said messages.

Because the destination is not indicated in the messages, substituting a signalling unit into the system does not affect the contents of the messages to be transmitted to this signalling unit, so that the signalling units originating these messages need not be adapted to the new situation. The only means required is to inform the control means of the modification and this is a simple operation which can be performed on-line.

Another advantage of the present system is that in case the signalling units are function units of the type described in the above mentioned articles and patent, i.e. with own data and own programme, a potential source of errors which may be made by a programmer writing the programme controlling the message transfer is eliminated because the programmer has not to indicate and even not to know the destination of these messages. He also has not to know the general structure of the system.

Another characteristic feature of the present signalling system is that use is also made of messages wherein the destination signalling unit is indirectly indicated.

Still another characteristic feature of the present signalling system is that said destination signalling unit is indicated in the data associated with the message.

Once the destination is known, use is made of messages wherein the destination is indicated in the data associated with the message, such so-called directed messages requiring less processing time of the control means than those wherein the destination is not at all indicated.

Yet another characteristic feature of the present signalling system is that said destination signalling unit is indicated as the contents of a predetermined storage location of data storage means of the signalling unit sending the message.

Since in the directed messages only a predetermined location of the storage means of the sending signalling unit and not a destination itself is indicated the above mentioned advantage with regard to the substitution of a signalling unit is also obtained.

To be noted that it is generally known to use programme techniques which may generally be termed virtual addressing and wherein a programmer can be ignorant of the specific structure of the system and more particularly of the physical location of the data he is working with. However, virtual addressing does not prevent different programmes from having access to the same data.

Another object of the present invention is to provide a signalling system of the type described at the beginning of this description and where predetermined rules are imposed to increase message handling reliability.

According to the invention this object is achieved due to the fact that for each of said signalling units, the receive and send means are able to receive a predetermined set of input messages and to send a predetermined set of output messages respectively, each sequence of at least one output message being assigned to at least one predetermined sequence of at least one input message.

In this way the transfer of data from or towards each signalling unit is submitted to strict rules, thus considerably contributing to an enhancement of the reliability of the system.

BRIEF DESCRIPTION OF THE DRAWINGS

The above mentioned and other objects and features of the invention will become more apparent and the invention itself will be best understood by referring to the following description of an embodiment taken in conjunction with the accompanying drawings in which.

DETAILED DESCRIPTION

Figure 1:
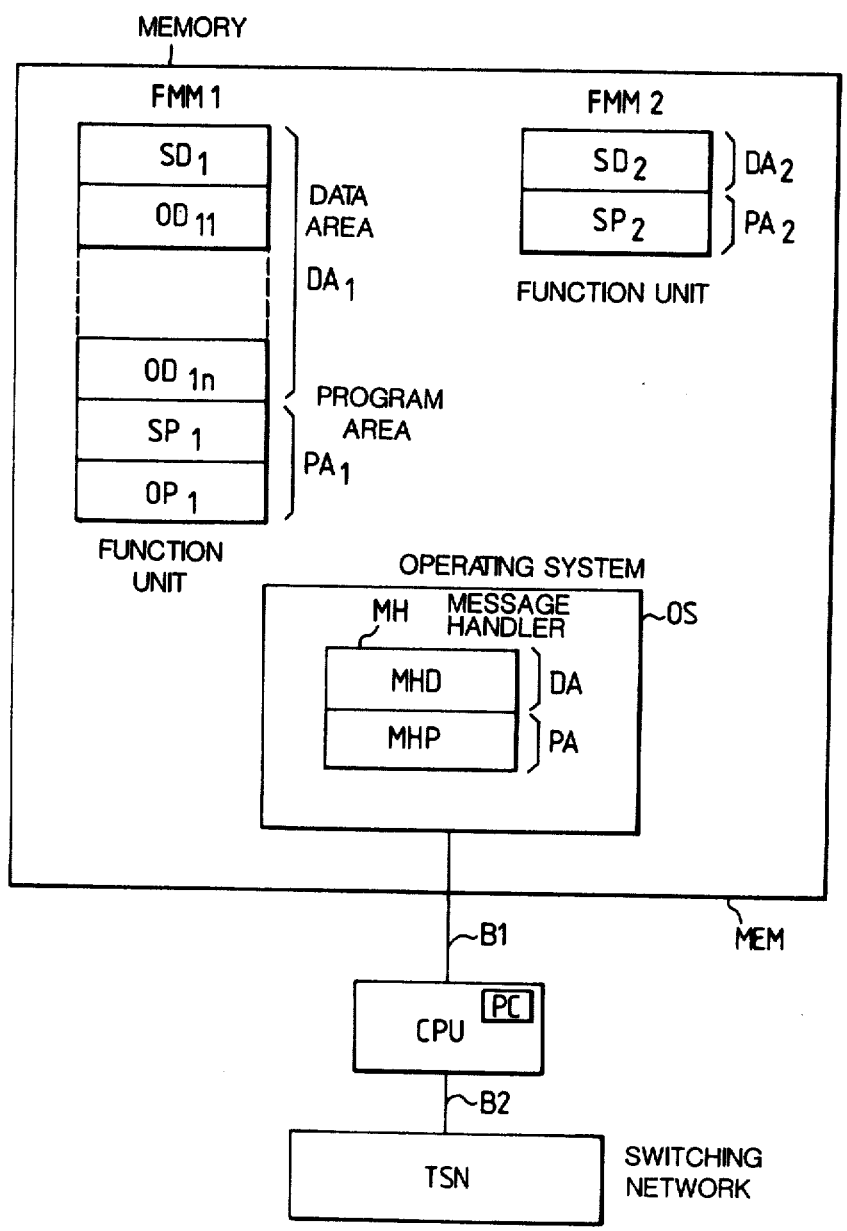
FIG. 1 is a schematic view of a signalling system according to the invention.

Reference is made to FIG. 1. The signalling system shown therein forms part of a processor controlled telecommunication switching system including a central processing unit CPU, with a programme counter PC, a memory MEM and a telecommunication switching network TSN. The CPU and the MEM can communicate with each other via the bus B1, whilst the CPU and the TSN can communicate with each other through the bus B2.

The memory MEM includes a plurality of signalling or function units of which only two are shown, i.e. FMM1 and FMM2, and an operating system OS including a message handler MH to control in cooperation with the CPU the transfer of messages between pairs of these function units.

These function units have the following characteristic features which all contribute to the reliability of the signalling system:
- each unit comprises its own data and its own programme having only access to the own data;
- each unit is able to receive a predetermined set of input messages and to send a predetermined set of output messages;
- each sequence of at least one output message of the set of output messages is sent only after a predetermined sequence of input messages out of the set of input messages has been received. Hereby the sequence of one or more input messages that gives rise to the sending of a sequence of one or more output messages may also contain the sequence that provokes the sending of another sequence of one or more output messages.

The own programme of each function unit includes reception and sending instructions in a predetermined sequence. Each of these instructions defines a procedure to be executed upon the receipt of an input message or upon the sending of an output message.

The internal working of a function unit is completely defined, although indirectly, when all the sequences of input and output messages of this unit are defined.

A function unit having the characteristics defined above may be called "a finite message machine" FMM because the number of input and output messages it is able to receive and send respectively being limited or finite.

Such a finite message machine does not postulate the existence of internal states as is the case with "a finite state machine".

A function unit such as defined above for instance forms part of a telephone exchange and has the following finite set of input messages:
  Offhook
  Reception digit
  Onhook
and the following finite set of output messages
  Dial tone
  Trunk seizure
  Digit sending
  Clear forward.

In this case the sequence of input messages which must be received to cause the sending of output messages are as follows, when calling:

digit A the digits that make up the trunk code and
digit B the rest of the digits

| Input sequences | Output sequences |
|---|---|
| 1. Offhook | Dial tone |
| 2. Offhook | |
| Reception digit A | Trunk seizure |
| 3. Offhook | |
| Reception digit A | |
| Reception digit B | Digit sending |
| 4. Offhook | |
| Reception digit A | |
| Reception digit B | |
| Onhook | Clear forward |

In a call in which a subscriber hangs up in the middle of dialing the sequences overlap as follows:

| | |
|---|---|
| Offhook | Dial tone |
| Reception digit A | Trunk seizure |
| Reception digit B | Digit sending |
| Onhook | Clear forward |

The sequence required for sending the output message "Digit sending" also contains the sequence required for sending the output message "Trunk seizure" so that both are generated.

The set of input messages able to be received by a function unit and the set of output messages able to be sent by this unit define an interface by which this unit communicates with the rest of the system. These messages are used to transfer data which to that end are included in the message, as will become clear later, and also to solve the problem of synchronization of various function units. Indeed, when for instance a function unit can only continue its operation after another unit has performed a particular function, the former unit will wait until it has received a message from the latter.

Use is made of messages comprising an identity and data, wherein the identity specifies:
  the type of message;
  the number of the message within that type;
  the priority by which the message has to be processed;
but wherein this identity does not specify neither the origin nor the destination of the message. Two types of messages are used:
  system basic messages wherein the destination is not specified neither in the identity nor in the data of the message;
  directed messages wherein the destination is specified in the data associated with the message.

System basic messages are used to establish a first link between two function units. When processing such a message first the destination of the message is determined by means of a routing table, whereafter this message is transferred to the destination. An advantage of the use of system basic messages is that when a function unit is substituted into the system the only operation having to be done consists in adapting the above mentioned routing table, it being not necessary to inform the other function units of this change. Also a programmer dealing with the processing of a system basic message need not known either the destination thereof nor information on the general structure of the system itself. One may for instance think of a system wherein a certain function unit not always exists e.g. a taxation function unit in a telephone exchange. In this case a system basic message providing taxation information will either be directed to the corresponding function unit if this unit is present and therefore mentioned in the above mentioned routing table or will be discarded if this unit is not mentioned in this table, but no error will be made in the latter case.

Directed messages are used as soon as a link between two function units has been established, i.e. as soon as the identity of the sending function unit has been communicated to the receiving function unit and inscribed in a location reserved for that purpose. This link is dynamic as it can be established, maintained and released as required. To be noted that, as already mentioned above, the use of directed messages decreases the work to be performed.

In the presently considered case of an automatic telecommunication switching system a large number of identical devices, e.g. trunks, digit receivers, included in the TSN, carry out a high number of identical functions concurrently, i.e. during the same time period but not necessarily exactly at the same time. Instead of providing in this case a separate function unit for each "occurrence" of the function which would lead to an excessively high number of such units, use is made of a multiple function unit which comprises a single common occurrence programme defining the logic of the function and a plurality of occurrence data. Different occurrence data are required because for each occurrence different data may be required, e.g. the addresses of the receivers will be different, the digits that each require are to be stored in different memory locations, etc. A function unit constructed like this is called an occurrence related function unit.

For supervision purposes, e.g. to recognize the existence of the many occurrences of such an occurrence related function unit, the latter unit is associated with a supervision function unit comprising a supervision programme and supervision data, both these multiple and supervision function units forming together a composite function unit. Each of these multiple and supervision function units has the above mentioned characteristic features.

Summarizing, a composite function unit comprises:
an occurrence related or multiple function unit which handles the real work of the function;
a supervision function unit which supervises the occurrence related function unit. It also handles resource allocation.

In case a directed message is sent to the supervision part of a composite function unit or to an ordinary function unit this message is called an external directed message, whereas this message is called a local directed message when it is directed from the supervision function unit of a composite function unit to an occurrence or function unit of the associated multiple function unit.

Use is made of sending and receiving instructions in the programme of a function unit to perform the sending and receipt of a message. These instructions are considered hereinafter.

The message sending instruction has the following form;

TRANSIT M1 (A, B, C, D) or TRANSMIT M2 (I, J) to H wherein:
M1 and M2 are the identities of the messages. As already mentioned above each identity comprises a type of message, a number within that type and a processing priority;

A, B, C, D and I, J are the identities of locations in the sending function unit wherein data are stored which are to be transferred to a destination function unit. To be noted that it is possible to send a message with no data;

H is the identity of the location wherein a link to another function unit is stored; this location is used only in the case of directed messages.

A function unit may indicate its own identity in the TRANSMIT instruction in the following way:

TRANSMIT M1 (A, B, C, OWN IDENTITY);

The message reception instructions have the following form:

WAIT;

ACCEPT (M1, M30, M31);

wherein:
WAIT is an instruction to indicate that the function unit may accept new messages;
ACCEPT is an instruction which indicates for each WAIT the messages, e.g. M1, M30, M31, which can be accepted.

The processing of any message received which is not indicated by the ACCEPT instruction will be automatically deferred or discarded, as instructed. The ACCEPT instruction is followed by a block of programme for each message accepted. This programme block indicates the actions to be carried out when the corresponding message is received and each such block is preceded by the identity of the message to which it refers. The end of each of these programme blocks is indicated by the instruction

ENDACCEPT

After this programme block has been executed control is transferred to the programme following the ENDACCEPT instruction.

Use may also be made of the instructions:

ALLOTHERS DISCARDED or ALLOTHERS DEFERRED

When this instruction is executed the processing of any message received which is not indicated in the ACCEPT instruction is discarded or deferred respectively.

Reference is again made to FIG. 1. Each of the function units FMM1 and FMM2 shown therein includes a data area and a programme area, e.g. DA1 and PA1 for FMM1 and DA2 and PA2 for FMM2. The message handler MH includes a data area DA and a programme area PA.

The function unit FMM1 is a composite function unit of the type described above and includes a supervision function unit and an occurrence related or multiple function unit. The supervision function unit comprises supervision data SD1 and a supervision programme SP1 having access to SD1 except for control data thereof, whilst the occurrence related function unit includes an occurrence related programme OP1 having access to a plurality of occurrence data OD11 to OD1n except for control data thereof. SD1 and OD11 to OD1n are stored in DA1, whilst SP1 and OP1 are stored in PA1. The sets OP1, OD11 to OP1, OD1n form function units or occurrences OC11 (FIG. 5) to OC1n respectively.

The function unit FMM2 is a simple function unit and includes supervision data SD2 and a supervision programme SP2 stored in DA2 and PA2 respectively. SP2 has access to SD2 except for a control data part thereof.

The message handler MH includes supervision data MHD and a supervision programme MHP stored in DA and PA respectively. MHP has access to MHD and to all data of the various function units.

Figure 2:
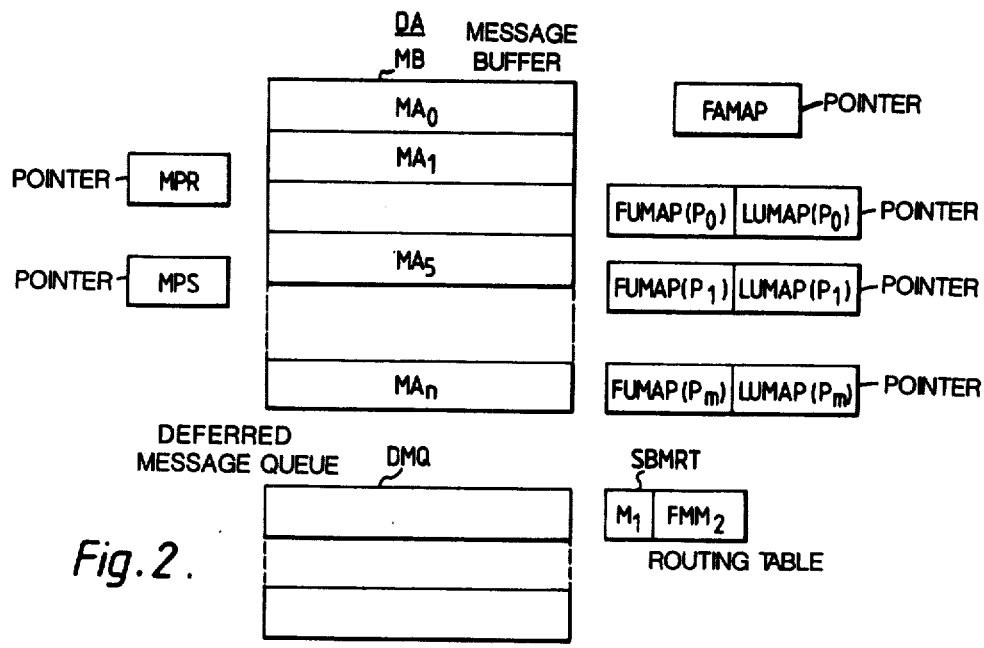
FIG. 2 represents data area DA of FIG. 1 in more detail.

The above mentioned message handler MH includes, as shown in FIG. 2:
a message buffer MB;
message receiver and sender pointers MPR and MPS;
a first available message area pointer FAMAP;
a plurality of pairs of pointers FUMAP (Po), LUMAP (Po) to FUMAP (Pm) to LUMAP (Pm);
a system basic message routing table SBMRT;
a deferred message queue DMQ.

The message buffer MB comprises a plurality of message areas MAo to MAn each for storing a message. The number of message areas is so chosen that buffer congestion never occurs under normal operating conditions of the system, including all overload situations. If buffer congestion nevertheless occurs this will be considered and treated as a fault. As will become clear later, the message areas are seized in a cyclic way in the order the messages are sent and a message area is not cleared after treatment of the message stored therein. Thus the buffer always contains a complete record of the n+1 last messages so that this record can be used for various purposes, such as tracing, statistical analysis, etc.

The message receiver pointer MPR is used to point to received messages, and the message sender pointer MPS is used to point to messages being sent. Two pointers are used to allow independent unpacking and packing of data carried by the messages.

The pointer FAMAP is used to manage the cyclic seizing of message areas and to contain the address of an available message area. When during a transmission operation a message area is seized in order to store a message therein the contents of the FAMAP are transferred into the message sender pointer MPS after which the FAMAP is incremented so that this pointer then points to the message area which is next in turn to be seized.

The pairs of pointers FUMAP (Po), LUMAP (Po) to FUMAP (Po), LUMAP (Pm) are allocated to message processing priorities Po to Pm respectively. Each of FUMAP (Po) to FUMAP (Pm) points to a first untreated message area, and each of LUMAP (Po) to LUMAP (Pm) points to a last untreated message area. These two pointers enable the messages to be organized in queues of linked messages. Hereby each priority has its own queue wherein messages of that priority are ordered in a first-in-first-out basis. This will be explained later.

Each of the pointers FUMAP (Po) to FUMAP (Pm) has two functions, i.e. to indicate whether or not an untreated message of that priority exists and to point to the first or oldest untreated message of that priority if such a message exists. Therefore each such pointer either contains an address of a message area or a special empty code E indicating that no message of the corresponding priority exists.

Each of the pointers LUMAP (Po) to LUMAP (Pm) allows linking of messages into a queue of corresponding priority and points to the last message area of the given priority or may contain the special empty code E indicating that no message of that priority exists.

The routing table SBMRT is used for indicating for each system basic message an assigned destination function unit, e.g. FMM2 is allocated to the system basic message with identity M1. The SBMRT is built-up at the moment the function units are loaded into the system.

The queue DMQ is used for storing messages the processing of which has been deferred.

Figure 3:
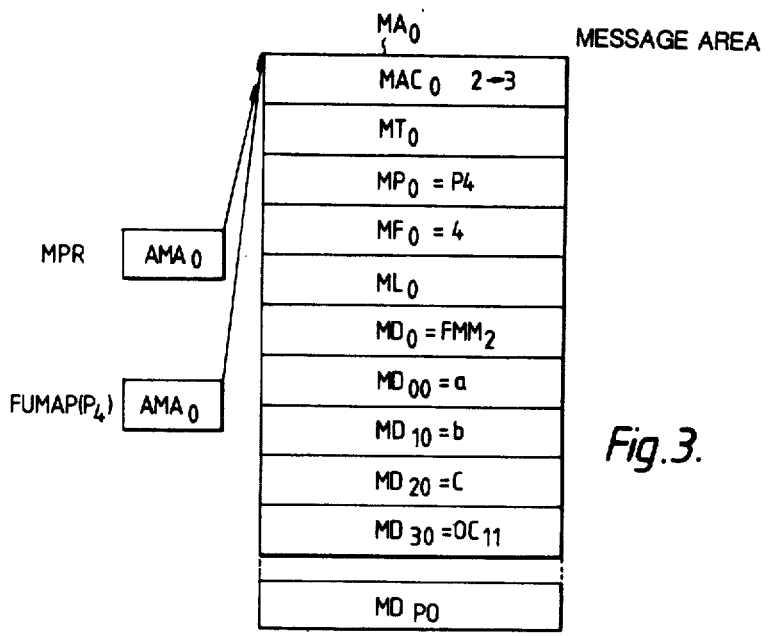
FIGS. 3 and 4 show message areas MA0 and MA5 of FIG. 2 in more detail respectively.

Reference is made to FIG. 3. The message area MAo shown therein contains the following data relating to message M1:
a message area condition code MACo which can be:
  0 indicating that the area is available for a new message;
  1 indicating that the area has been seized;
  2 indicating that the area contains an untreated message;
  3 indicating that the area contains a message under treatment;
a message type and number MTo both included in the identity M1 of the message;
a message priority MPo, i.e. the priority by which the message has to be processed. This priority also forms part of the identity M1;
a message format MFo, i.e. the number of words of data contained in the message;
a message link MLo which may contain a pointer to the next message of the same priority or which stores the empty code E if no such next message exists;
a message destination MDo;
message data MDoo to MDpo.

Figure 4:
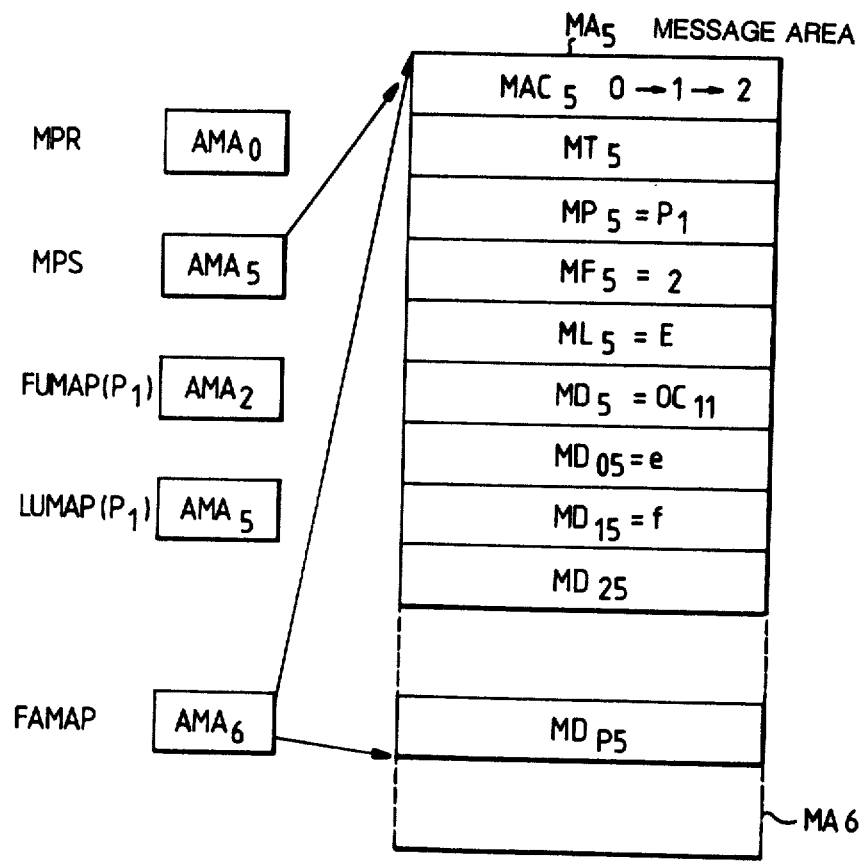

The message area MA5 represented in FIG. 4 stores similar data but now with regard to message M2.

Figure 5:
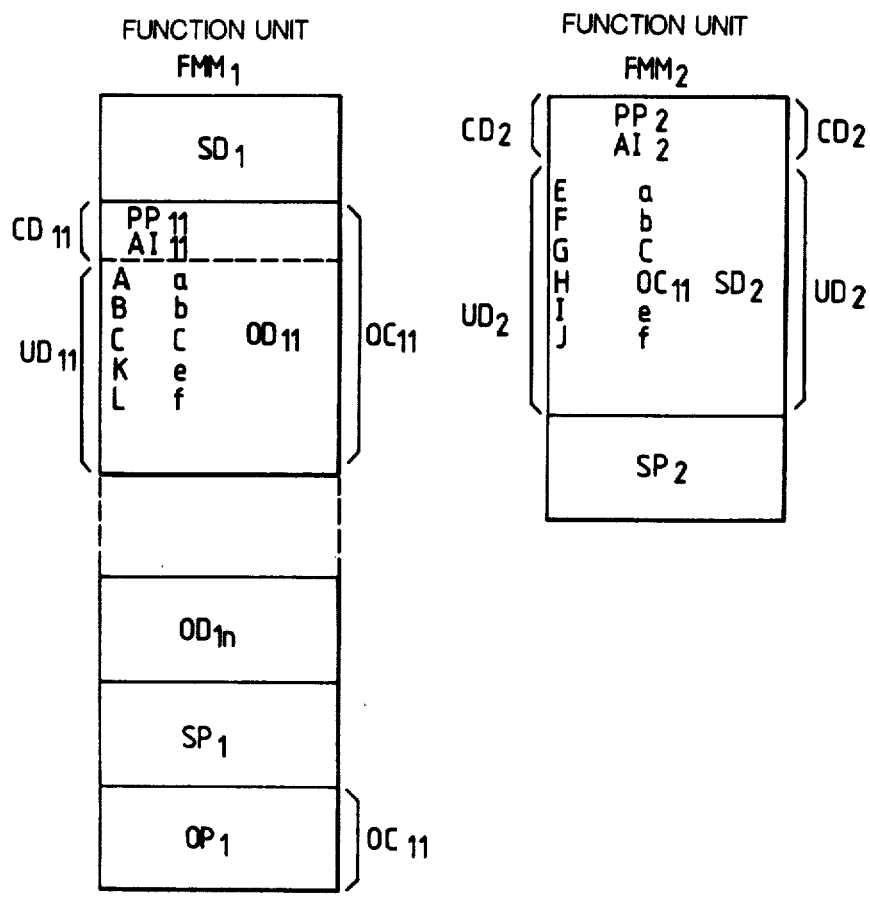
FIG. 5 represents function units FMM1 and FMM2 of FIG. 1 in more detail.

Reference is made to FIG. 5. The occurrence OC11 of the composite function unit FMM1 shown therein includes:
first occurrence data OD11 which comprises user data UD11 only accessible to the occurrence dependent programme OP1 and control data CD11 only accessible to the operating system OS. The latter data CD11 includes a programme pointer PP11 and an action indicator AI11 to indicate either that the function unit is in the wait condition, wherein it awaits new messages, or is in the execution condition wherein it can receive and transmit messages. The user data UD11 are stored in a plurality of storage locations such as those with addresses A, B, C, K, L;
an occurrence dependent programme OP1 which is as follows

```
. . .
TRANSMIT M1 (A, B, C, OWN IDENTITY);
WAIT;
ACCEPT (M2, ALLOTHERS DEFERRED);
M2 (K, L):
. . .
. . .
. . .
TRANSMIT M6;
ALLOTHERS DEFERRED:
. . .
. . .
. . .
ENDACCEPT;
```

This programme thus specifies that occurrence OCC11 of FMM1 is able to send output messages M1 and M6. Hereby system basic message M6 is sent subsequent to the receipt of input message M2.

The function unit FMM2 includes:
supervision data SD2 which comprises user data UD2 only accessible to the supervision programme SP2 and control data CD2 only accessible to the operating system OS. The latter data includes a programme pointer PP2 and an action indicator AI2 to indicate that the function unit is in the wait condition or in the execution condition;
a supervision programme SP2 which is as follows:

```
...
WAIT;
ACCEPT (M1, M30, M31, ALLOTHERS DISCARDED);
M1 (E, F, G, H):
...
...
...
TRANSMIT M2 (I, J) to H;
M30 (...):
...
...
...
TRANSMIT M3 (M, N);
M31 (...);
...
...
...
TRANSMIT M4 (P, Q, R);
ALLOTHERS DISCARDED;
ENDACCEPT;
WAIT;
ACCEPT (M34, ALLOTHERS DISCARDED);
M34 (S, T):
...
...
...
WAIT;
ACCEPT (M35, ALLOTHERS DISCARDED);
M35 (U, V):
...
...
...
TRANSMIT M5 (X, Y);
ALLOTHERS DISCARDED;
ENDACCEPT;
```

This programme thus specifies that FMM2 is able to send the following messages:
message M2 subsequent to the receipt of message M1;
message M3 subsequent to the receipt of message M30;
message M4 subsequent to the receipt of message M31;
message M5 subsequent to the receipt of either one of the sequences of messages M1, M34, M35 or M30, M34, M35 or M31, M34, M35.

Figure 6:
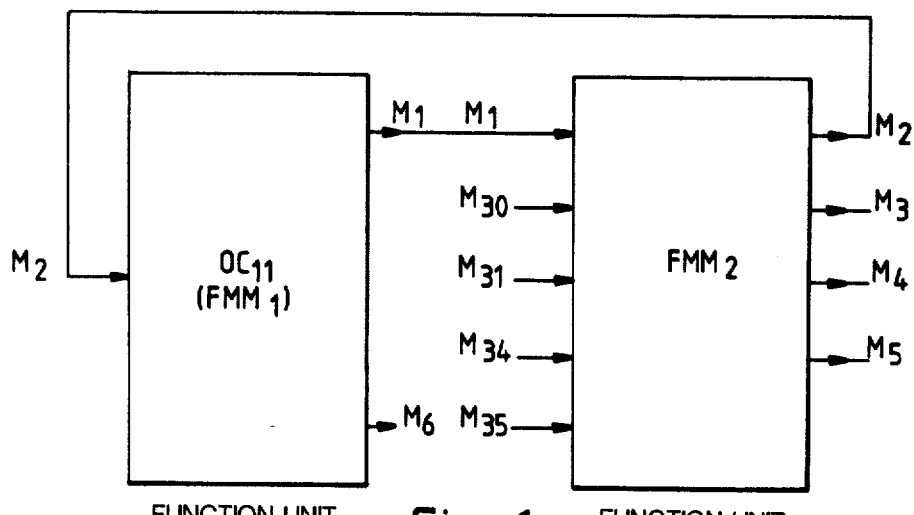
FIG. 6 is a schematic view of messages able to be sent and received by FMM1 and FMM2 of FIG. 1.

From the above it follows, as illustrated in FIG. 6, that:
OC11 has a set of input messages including message M2 and a set of output messages including messages M1 and M6. OC11 is able to send message M6 subsequent to the receipt of message M2 to which M6 is assigned;
FMM2 has a set of input messages including messages M1, M30, M31, M34, M35 and a set of output messages including messages M2, M3, M4 and M5. Hereby the latter messages are assigned to the sequences of input messages M1, M30, M31 and M1, M34, M35 or M30, M34, M35 or M31, M34, M35 respectively.

Instead of a single output message also a sequence of output messages can be assigned to a sequence of input messages.

The operation of the above described system is considered hereinafter. However only part of the above programmes is described, more particularly only the programme part is considered which controls the transmission of a system basic message M1 by occurrence OC11 of FMM1, this occurrence OC11 comprising OD11 and OP1, and which controls the subsequent transmission of a directed message M2 from FMM2 to this occurrence OC11 via the established link between OC11 and FMM2.

It is supposed that parameters a, b and c have previously been stored in the memory locations with relative addresses A, B, C of UD11 of OC11 of FMM1 (FIG. 5).

As a result of the execution of the programme given above for FMM1, the system basic message M1 with type and number MTo and priority MPo has been transmitted by occurence OC11 of function unit FMM1. Due to this the data associated to the message M1 have been stored in a message area e.g. MAo of MB. After the operation the occurrence OC11 is in the WAIT condition following the above mentioned TRANSMIT M1 instruction, the action indicator AI11 indicates that OC11 is in the wait condition, and the programme pointer PP11 points to the ACCEPT instruction following this WAIT instruction.

The message area MAo stores:
MACo=0
MTo
MPo=P4
MFo=4
MIo=E
MDo=FMM2
MDoo=a
MD10=b
MD20=c
MD30=OC11

From this it follows that the message M1 has priority P4 and destination FMM2 and is associated with 4 parameters a, b, c and OC11. It is also supposed that the address AMAo of MAo has been stored in the pointer FUMAP (P4) allocated to the priority P4.

It is assumed that programme pointer PP2 of function unit FMM2 points to the instruction

ACCEPT (M1, M30, M31, ALLOTHERS DISCARDED)

and that the action indicator AI2 indicates that function unit FMM2 is in the wait condition.

Because the system basic message M1 is written in a message area, more particularly in MAo of MB, this message is ready for being sent to the destination function unit, here FMM2. This is described hereinafter.

The message handling programme MHP at a certain moment controls the execution of the following operations (FIG. 3):
one of the priorities Po to Pm, e.g. P4 is selected;
the pointer FUMAP (P4) allocated to this priority P4 is read to find the address AMAo of the first untreated message area MAo;
this address AMAo is written in the message receiver pointer MPR;

the message link MLo stored in the message area MAo indicated by MPR is written in FUMAP (P4). Here it is supposed that MLo contains the empty code E, due to which it is indicated that no other untreated message of priority P4 than that stored in MAo exists;

the code MACo of MAo is set to 3, thereby indicating that the message stored in area MAo is under treatment;

the message type and number MTo and the message destination MDo=FMM2 stored in MAo are used to determine the location of the control data of a function unit. The control data thus determined is CD2 of function unit FMM2;

the action indicator AI2 of CD2 is modified so as to put FMM2 in the execution condition;

the programme pointer PP2 is loaded in the programme counter PC of CPU.

Due to this, the programme SP2 of function unit FMM2 is executed starting from the instruction:

ACCEPT (M1, M30, M31, ALLOTHERS DISCARDED);

Under the control of this instruction it is checked if the message M1 stored in the message area MAo is awaited by FMM2 or not i.e. if the identity M1 is specified in the above ACCEPT instruction or not:

in the negative the programme SP2 jumps to the instruction

ALLOTHERS DISCARDED which will be considered later;

in the affirmative, as is supposed here, the programme block M1 (E, F, G, H) of FMM2 is executed so that the data a, b, c, OC11 stored in MAo are transferred into the respective storage locations E, F, G and H of the user data UD2 of FMM2 (FIG. 5). Hereby H is the storage location specially reserved for storing the origin of a message, this origin being the destination of a subsequent message to be sent to this origin.

From the above it follows that the system basic message M1 has been accepted in FMM2 and that the identity of the sender, i.e. OC11, has been inscribed in the predetermined storage location H of FMM2 so that FMM2 can subsequently sent back a directed message M2 to OC11. This is described hereinafter.

At the end of the programme block related to the acceptance of M1 the instruction TRANSMIT M2 (I, J) to H is executed.

This instruction controls the execution of the following steps, it being supposed that parameters e and f have previously been stored in the locations I and J of UD2 (FIG. 5):

get available message area of the message buffer MB:
  by reading the pointer FAMAP the address of the first available message area of the MB is obtained, e.g. AMA5 of MA5 (FIG. 4);
  the condition MAC5 of MA5 is checked. If it is equal to 0 or 1 MA5 is seized by making MAC5 equal to 1. For value 2 or 3 of MAC5 an indication of a fault is generated;
  the contents of FAMAP, i.e. AMA5, is written in MPS;
  the pointer FAMAP is incremented so that it then indicates the address AMA6 of the following available message area MA6;

pack message data, by collecting them and storing them in the message area MA5 indicated by MPS:
  the type and number MT5 and the priority MP5=P1 both derived from the message identity M2;
  the parameters e, f read from the storage locations I, J of UD2. These parameters are stored in MD05 and MD15 respectively;
  the format MF5 equal to 2 because there are two 2 parameters e and f;
  the destination MD5 equal to OC11 read from storage location H (FIG. 5).

send message away by executing the following steps:
  MAC5 of MA5 is set to 2, due to which it is indicated that the message M2 stored in MA5 is an untreated message;
  if the FUMAP (P1) allocated to the priority P1 contains the empty code E then the address AMA5 stored in MPS is written in FUMAP (P1). The reason for this operation is the following: because the FUMAP (P1) contains the code E there is no other message area of priority P1 than MA5 and therefore the address AMA5 should be written in FUMAP (P1):
  if the FUMAP (P1) does not contain the code E, the address AMA5 stored in MPS is written in the message link of the message area indicated by LUMAP (P1), e.g. in ML2 of MA2 (not shown). The reason for this is the following: because the FUMAP (P1) does not contain the code E there is another message area than MA5, e.g. MAo, wherein a message with priority P1 is stored and therefore MA5 has to be linked with the area MA2;
  the address AMA5 stored in MPS is written in LUMAP (P1) to indicate that MA5 has become the last received message of priority P1;
  the code E is written in the message area ML5 of MA5 because MA5 is not linked with a further area.

From the above it follows that the directed message M2 has been transmitted by FMM2, meaning that the data associated with this message have been stored in the message area MA5 of MB and that this message has been linked to other messages of some priority.

After having executed the TRANSMIT instruction the programme SP2 jumps to the instruction following the ENDACCEPT instruction, i.e. to:

WAIT

ACCEPT (M34 ALLOTHERS DISCARDED);

Under the control of the WAIT instruction the following operations are performed:
  the code MACo of MAo indicated by pointer MPR is reset to 0, due to which this area MAo becomes again available;
  the programme pointer PP2 is so modified that it points to the instruction following the WAIT instruction i.e. to the last mentioned ACCEPT instruction;

the action indicator AI2 is so modified that it indicates that FMM2 is in the waiting condition.

Summarizing from the above description it follows that:

the action indicator AI2 of FMM2 is set to the execution condition due to which the execution of the programme indicated by the programme pointer PP2 is started;

by an ACCEPT instruction the data stored in MAo associated with a system basic message M1 is transferred into the memory of function unit FMM2:

by a TRANSMIT instruction data associated with the directed message M2 are packed in an available message area MA5 of the message buffer MB and sent away, i.e. linked with other messages of the same priority;

by a WAIT instruction the message area MA5 is put in the untreated condition, the programme pointer PP2 is set so as to point to an ACCEPT instruction, and the action indicator AI2 is brought in the condition indicating that FMM2 is in the wait condition.

Hereby:

the FUMAP is used to indicate the first available message area of MB wherein a message can be stored;

the FUMAP for each priority is used to indicate the first area of MB wherein a message of this priority is stored which has to be received first;

the LUMAP for each priority is used to indicate the area of MP wherein a message is stored with which the message of the same priority and which is newly sent has to be linked.

By making use of the message buffer MB and the associated pointers the messages are stored in their order of transmission and several queues of linked messages are formed, those belonging to a same queue having same priority and being linked in their order of transmission.

In what precedes it has been supposed that message M1 had already been sent by FMM1. It will now be clear that this was the result of the execution of the programme OP1 of OC11 of FMM1 and more particularly of the

TRANSMIT M1 (A, B, C, OWN IDENTITY)

and

WAIT instructions. This execution indeed leads to the transfer of the data a, b, c stored in the storage locations A, B, C of UD11 of OC11 and of OC11 into the available message area MAo of MB represented in FIG. 3.

It should be noted because the message M1 is a system basic message the message destination MDo is determined by means of routing table SBMRT (FIG. 2).

In the above described example a system basic message M1 was sent by OC11 of FMM1 and received in FMM2. In case such a system basic message is sent by FMM2 and it is found that it for instance has FMM1 as a destination, this message will be processed by the supervision programme SP1 of FMM1. This programme then allocates an occurrence, e.g. OP1, OD11, to the message and afterwards the data associated with the system basic message are transmitted to this occurrence by means of local directed messages.

From the above it also follows that:

for a system basic message, such as M1, the destination is determined by means of the basic message routing table SBMRT;

for a directed message, such as M2, the destination is not specified in the identity but indirectly as the contents of a reserved location H.

For these reasons the substitution of a function unit, say FMM3, for another one, e.g. FMM2, has no affect on these messages and all what has to be done for the system basic messages is to update the routing table SBMRT by simply substituting in this table the identity of FMM2 by the identity of FMM3. This can be performed on-line.

Another possibility is to indicate in this table an alternative FMM, e.g. FMM2 and FMM3 for message M1, and to use FMM3 only for test purposes. After FMM3 has for instance been tested sufficiently and successfully only FMM3 is maintained in the table.

As mentioned above use is made of the instructions ALLOTHERS DEFER and of ALLOTHERS to defer and discard the processing of messages respectively.

More particularly, when a discard instruction is executed in a function unit:

the action indicator thereof is put in the wait condition, but the programme pointer is maintained in its position. One indeed still waits for the same message(s);

the area of MB wherein the message to be discarded is stored is reset to 0, so that this message is indeed ignored;

the message handler is called to schedule the next message.

In case of a defer instruction is executed in a function unit:

again the action indicator thereof is put in the wait condition, but the programme pointer is maintained in this position;

the condition of the area of MB wherein the message is stored is maintained equal to 2 indicating that this message is still untreated.

To treat such deferred messages, one can make use of several possibilities:

put the message on top of the buffer MB so that it will again be considered later;

put the message in a special deferred message queue DMQ having a predetermined priority, this queue being handled in an analogous way as described above for the other queues.

Although in the above the message transfer and the filtering of messages at the input and at the output of the function units have been performed by software means, it is clear that this could be performed equally well by hardware means.

While the principles of the invention have been described above in connection with specific apparatus, it is to be clearly understood that this description is made only by way of example and not as a limitation on the scope of the invention.

What is claimed is:

1. In an electronic communication system for processing calls between terminals of the system in response to call processing signals from calling ones of said terminals, said system comprising a processor, a memory associated with said processor for storing messages for controlling the processing of said calls through the system, said memory comprised of a plurality of modular function units for furthering the processing of calls through the system, in which each of said function units comprises message data storage and program storage areas, each program storage area comprising receiving and transmitting procedure instructions for the message data storage area of the same function unit, and in which the processing of calls comprises the transmission of call control messages generated in one function unit between data storage areas of different function units in response to signals directed to said memory from system terminals, the improvement comprising a first and a second type of data messages stored in the message areas of the units, the data messages of the first type in which the message includes indentification of a destination function unit for the message and data messages of the second type in which the destination function unit for the message is not specified in the message, and in which each unit includes a message handler for controlling the transmission of messages of the second type, each said message handler comprising a routing table containing destination unit identification to which reference is made to determine the destination unit for a message of the second type for transmission thereto of that message.

2. In a call processing system as claimed in claim 1, wherein the program area of each unit includes a finite number of sending and receiving instructions to control the sending and receipt of messages for a plurality of calls in process by that unit.

3. In a call processing system as claimed in claim 2, wherein each program storage area includes said sending and receiving instructions in a predetermined sequence with each instruction defining a call switching process to be executed by the system.

4. In a call processing system as claimed in claim 2, wherein each message handler comprises a routing table containing destination unit address information for messages of the second type and wherein a message of said second type is used to establish a first link between a transmitting and a destination unit by reference is made to a routing table at the transmitting unit for determining the destination unit for the message thereafter.

5. In a call processing system as claimed in claim 1, in which each program storage area contains instructions for acting only on data stored in the message areas of the same unit.

* * * * *